United States Patent
Pire (10) Patent No.: US 9,898,933 B2
(45) Date of Patent: Feb. 20, 2018

(54) METHOD AND A DEVICE FOR ASSISTING LOW ALTITUDE PILOTING OF AN AIRCRAFT

(71) Applicant: AIRBUS HELICOPTERS, Marignane (FR)

(72) Inventor: Richard Pire, Istres (FR)

(73) Assignee: Airbus Helicopters, Marignane (FR)

( * ) Notice: Subject to any disclaimer, the term of this patent is extended or adjusted under 35 U.S.C. 154(b) by 69 days.

(21) Appl. No.: 15/015,446

(22) Filed: Feb. 4, 2016

(65) Prior Publication Data

US 2016/0240089 A1 Aug. 18, 2016

(30) Foreign Application Priority Data

Feb. 16, 2015 (FR) ...................................... 15 00298

(51) Int. Cl.
| | | |
|---|---|---|
| *G08G 5/00* | (2006.01) | |
| *G08G 5/04* | (2006.01) | |
| *G05D 1/06* | (2006.01) | |
| *G01S 13/94* | (2006.01) | |

(52) U.S. Cl.
CPC ......... *G08G 5/0086* (2013.01); *G05D 1/0646* (2013.01); *G08G 5/045* (2013.01); *G01S 13/94* (2013.01)

(58) Field of Classification Search
CPC .... G08G 5/0086; G08G 5/045; G05D 1/0646; G01S 13/94
See application file for complete search history.

(56) References Cited

U.S. PATENT DOCUMENTS

| | | | |
|---|---|---|---|
| 5,555,175 A * | 9/1996 | D'orso | G08G 5/0086 701/301 |
| 7,499,773 B2 | 3/2009 | Pire et al. | |
| 2007/0055418 A1* | 3/2007 | Pire | G01S 13/94 701/14 |
| 2007/0265776 A1 | 11/2007 | Meunier et al. | |
| 2008/0208400 A1 | 8/2008 | Bouchet et al. | |
| 2010/0042273 A1 | 2/2010 | Meunier et al. | |
| 2011/0210871 A1 | 9/2011 | Flotte et al. | |

FOREIGN PATENT DOCUMENTS

| | | |
|---|---|---|
| FR | 2712251 | 5/1995 |
| FR | 2886439 | 12/2006 |

OTHER PUBLICATIONS

French Search Report for French Application No. 1500298, Completed by the French Patent Office on Dec. 3, 2015, 7 Pages.

* cited by examiner

*Primary Examiner* — Adam D Tissot
(74) *Attorney, Agent, or Firm* — Brooks Kushman P.C.

(57) ABSTRACT

A method of assisting low altitude piloting of an aircraft and comprising determining at least one main guard curve, determining all of the obstacles present in at least one search zone, and performing a comparison between a top of each obstacle of a search zone and the main guard curve. In order to perform the comparison, if at least one "potentially dangerous" obstacle is situated above the main guard curve in a search zone, then, for each potentially dangerous obstacle, a sight angle ($\alpha$) is determined for the top of the potentially dangerous obstacle, and it is considered that the most dangerous obstacle is the potentially dangerous obstacle presenting the greatest sight angle ($\alpha$).

14 Claims, 3 Drawing Sheets

METHOD AND A DEVICE FOR ASSISTING LOW ALTITUDE PILOTING OF AN AIRCRAFT

CROSS REFERENCE TO RELATED APPLICATION

This application claims priority to French patent application No. FR 15 00298 filed on Feb. 16, 2015, the disclosure of which is incorporated in its entirety by reference herein.

BACKGROUND OF THE INVENTION (1) Field of the Invention

The present invention relates to a method and to a device for assisting low altitude piloting of an aircraft.

The technical field of the invention is the field of fabricating piloting assistance systems for use on board rotorcraft.

(2) Description of Related Art

Low altitude flight constitutes a difficult operation. In order to avoid obstacles, a pilot can rely only on seeing the surrounding space, on external aids such as sensors and cameras, usually without distance information, and on the pilot's knowledge of the aircraft being flown. The pilot must thus evaluate the presence of potentially dangerous obstacles on the path being followed and must also evaluate the ability of the aircraft to avoid those obstacles, given the aircraft's maneuverability.

Under conditions of poor visibility or at night, low altitude flights are that much more difficult to carry out. The pilot may have difficulty in seeing potential obstacles under poor environmental conditions.

Consequently, an aircraft may include a piloting assistance device providing information for indicating the presence of obstacles and enabling them to be avoided.

Patent FR 2 712 251 describes a method of assisting piloting in which a guard curve is used to determine the obstacles that are the most dangerous for the aircraft.

Such a guard curve may be constituted essentially by a circularly arcuate segment. The circularly arcuate segment presents a radius equal to the sum of the minimum pull-up and minimum pitch-down radii that are acceptable for the aircraft. Furthermore, the guard curve may include a horizontal segment upstream from the circularly arcuate segment. Under such circumstances, the guard curve has a horizontal portion extended by a circularly arcuate segment, thus presenting the shape of a ski presenting an upwardly curved tip.

The guard curve may be associated with a guard height, the guard curve being positioned at a height below the aircraft that is equal to the guard height.

Anything situated above the guard curve thus presents a potential obstacle.

In that method, a piloting assistance device divides the forward field situated in front of the aircraft into a plurality of angular sectors. The forward field represents the space that can be reached by the aircraft starting from its current position.

The piloting assistance device then acts for each sector to detect obstacles by means of a telemeter detector. The piloting assistance device then compares the tops of the obstacles with the guard curve.

In each angular sector, the piloting assistance device defines tops that are situated higher than the guard curve as being dangerous obstacles. For example, the altitude of each obstacle is calculated. Under such circumstances, the piloting assistance device determines a difference in altitude between the altitude of each obstacle and the point of the guard curve situated above or below the obstacle. The most dangerous obstacle is the obstacle for which the altitude difference presents the greatest algebraic value.

Each dangerous obstacle is shown to a pilot by being superposed on an image of the external landscape, which image also includes crosshairs representing the speed vector of the aircraft collimated at infinity. By way of example, dangerous obstacles are represented in the form of respective crosshairs. The piloting assistance device may also display a smoothed safety curve that is situated at a guard height above the dangerous obstacles. In order to fly as close as possible to the obstacle, the pilot must then cause the crosshairs representing the speed vector to lie on said curve.

Nevertheless, the presence of the crosshairs representing the speed vector at a location above the safety curve does not guarantee that the aircraft is in complete safety. For example, if the aircraft is flying in a valley, a turning maneuver might cause the aircraft to face a wall that could be difficult to avoid.

Furthermore, if at some instant the pilot does not comply with the procedure that should be applied, then a problematic situation can arise.

In such a situation, a first obstacle may then lie below the speed vector of the aircraft and at a first height above the guard curve.

A second obstacle may lie above the speed vector and at a second height above the guard curve. If the second height is less than the first height, then the first obstacle is designated as being the most dangerous obstacle. The pilot may be unworried since the obstacle designated as the most dangerous obstacle is situated below the speed vector. Nevertheless, the second obstacle represents a potential danger.

Patent FR 2 886 439 describes an alternative guard curve.

That guard curve has a first circular arc presenting a radius equal to the sum of the minimum pull-up radius authorized for the aircraft plus a ground guard height.

Furthermore, the static guard curve includes a second circular arc downstream from the first circular arc. The second circular arc presents a radius equal to the sum of said minimum pull-up radius authorized for the aircraft plus a minimum pitch-down radius authorized for the aircraft. The first circular arc and the second circular arc present a common tangent at the point where they join together.

The first circular arc then extends from a point situated on a straight line passing through the aircraft and through the center of the circle containing said first circular arc to the second circular arc.

Furthermore, a distance D between the guard curve and the obstacle is calculated. A pitch-down or pull-up order $$\frac{d\varphi}{dt}$$

is determined in application of the following formula:

$$\frac{d\varphi}{dt} = G*\left(D + \tau * \frac{dD}{dt}\right)$$

where "G" is a gain and "τ" is a warning time.

Under such circumstances, a pull-up order is given when the sum $$\left(D + \tau * \frac{dD}{dt}\right)$$

is negative. A pitch-down order is given when the sum is positive.

Documents US 2011/210871, US 2010/042273, US 2007/265776, and US 2008/208400 are also known.

BRIEF SUMMARY OF THE INVENTION

An object of the present invention is to define an alternative method seeking to reduce the above-described drawbacks.

The invention thus provides a method of assisting low altitude piloting of an aircraft, the method comprising the steps of determining at least one guard curve referred to as a "main" guard curve as a function of predetermined pull-up and pitch-down maneuvering capabilities of the aircraft, determining all of the obstacles present in at least one search zone, performing a comparison between a top of each obstacle in a search zone and said main guard curve, determining a "most dangerous" obstacle as a function of said comparison, and communicating information to a pilot about the most dangerous obstacle.

In order to perform the comparison, if at least one obstacle is a "potentially dangerous" obstacle having a top situated above the main guard curve in a search zone, then for each potentially dangerous obstacle the method comprises determining a sight angle for the top of the potentially dangerous obstacle, and the most dangerous obstacle is the potentially dangerous obstacle presenting the greatest sight angle.

It should be recalled that sight angle of a point relative to an aircraft is the angle between a horizontal reference plane containing the aircraft for example his center of gravity and a straight line passing through said aircraft and said point.

Each sight angle of an obstacle is considered as being positive when a point associated with the obstacle and identified by the sight angle is located above a horizontal reference plane containing said aircraft and as being negative when it is located below the reference plane.

In this method, a guard curve is established. The guard curve may be established using the teaching of Document FR 2 712 251 or of Document FR 2 886 439. The guard curve is used to determine the most dangerous obstacle in at least one search zone. Each of the determined most dangerous obstacles may be used in accordance with the teaching of Document FR 2 712 251 or of Document FR 2 886 439 for the purpose of giving a pilot information about the most dangerous obstacle. For example, a safety cordon may be established in compliance with the teaching of Document FR 2 712 251 or of Document FR 2 886 439.

Under such circumstances, attention is given to above-ground obstacles that are present in at least one search zone. These obstacles may be detected using Lidar or radar telemeters or indeed using stereoscopic viewing systems. The obstacles may also be stored in a conventional database.

For each obstacle situated above the main guard curve, the method does not take account of the height between the top of the obstacle and the guard curve in order to determine the obstacle that is the most dangerous relative to the main guard curve, but rather it takes account of a sight angle associated with the top of the obstacle.

Thus, in the invention, during a comparison step, the sight angle of each top situated above the curve is established, and the top presenting the greatest sight angle represents the obstacle that is the most dangerous.

Thus, and in accordance with the above example, a first obstacle may be below the speed vector of the aircraft and at a first height that is above the guard curve. A second obstacle may be above the speed vector and at a second height above the guard curve, with the second height being less than the first height. The top of the second obstacle nevertheless presents a sight angle that is greater than the top of the first obstacle relative to the aircraft.

Unlike some of the prior art, the second obstacle represents the most dangerous obstacle.

Under such circumstances, the presence of a speed vector collimated at infinity and located above a safety cordon established in accordance with the teaching of Document FR 2 712 251 or of Document FR 2 886 439 continues to represent a state in which the aircraft is safe.

The present method may also include one or more of the following characteristics.

By way of example, and in a first variant, the sight angle of an obstacle may be established by determining the angle between a horizontal reference plane containing the aircraft and a straight line passing through said aircraft and the top of the obstacle.

In a second variant, in order to determine the sight angle of a potentially dangerous obstacle, the following steps are performed:

determining the position of a point referred to as a "safety" point situated above the potentially dangerous obstacle at a predetermined guard height above the potentially dangerous obstacle; and determining a sight angle of said safety point, said sight angle of said potentially dangerous obstacle being equal to said sight angle of said safety point.

Under such circumstances, determining the sight angle of an obstacle takes a safety guard height into consideration.

Furthermore, and in a first alternative, in order to perform the comparison in a search zone, if no obstacle is a potentially dangerous obstacle and thus situated above the main guard curve, then a value of a difference criterion is determined for each obstacle representing the difference between said obstacle and the main guard curve, said most dangerous obstacle being the obstacle presenting the smallest difference criterion.

In the absence of an obstacle located above the ground, the most dangerous obstacle is represented by the ground.

The difference criterion may for example be a height between a top of an obstacle and said guard curve in a vertical direction.

In a second alternative, in order to perform the comparison, if no obstacle is a "potentially dangerous" obstacle, a guard curve referred to as a "secondary" guard curve is determined that is offset in time relative to the main guard curve by being situated at least in part downstream from the main guard curve in the direction of advance of the aircraft, the most dangerous obstacle being the obstacle having its top situated the highest relative to the secondary guard curve.

The main guard curve seeks for example to represent an avoidance path that is associated with a first warning time. Under such circumstances, the secondary guard curve seeks for example to represent an avoidance path associated with a second warning time that is longer than the first warning time. Under such circumstances, the secondary guard curve is offset in time relative to the main guard curve.

If no obstacle presents a top situated above the secondary guard curve, then the second alternative seeks to determine the most dangerous obstacle as a function of the secondary guard curve.

The main and secondary guard curves may be determined as a function of different parameters.

Furthermore, a forward field situated in front of the aircraft may be subdivided into a plurality of search zones, and a most dangerous obstacle may be determined for each search zone.

In addition, a symbol may be displayed on a display for each most dangerous obstacle, each symbol representing a most dangerous obstacle in a search zone, and a safety cordon may be displayed interconnecting said symbols.

For example, the display may display a representation of the forward field. The display superposes a symbol on this representation for each most dangerous obstacle together with a safety cordon interconnecting the symbols. The teaching of patent FR 2 712 251 may be applied in order to obtain such a representation.

Furthermore, the symbol representing a most dangerous obstacle may be positioned at the height of the top of that obstacle.

Nevertheless, the symbol representing the most dangerous obstacle may be positioned at a height corresponding to the sum of the height of the top of the obstacle plus a guard height.

By way of example, in each search zone the coordinates are determined of a reference point situated at a predefined distance above the top of the most dangerous obstacle, said symbol representing said reference point.

Furthermore, a speed vector of the aircraft collimated at infinity may be determined. Thus, a sign is displayed representing the speed vector on the display, with an alarm being triggered when said speed vector is below the safety cordon.

Furthermore, at least one guard curve may include a "downstream" circular arc presenting a "downstream" radius equal to the sum of a predetermined minimum pull-up radius plus a predetermined minimum pitch-down radius.

The minimum pitch-down radius and the minimum pull-up radius may be constant, or they may vary as a function of at least one parameter, for example. Thus, the minimum pitch-down radius and the minimum pull-up radius may vary as a function of at least one parameter selected from the following list: a speed of advance of the aircraft; the pressure of the air outside the aircraft; the temperature of the air outside the aircraft; and the weight of the aircraft.

In addition, when a main guard curve and a secondary guard curve are determined, the main guard curve and the secondary guard curve present, by way of example, two different respective downstream radii.

In a first implementation, the guard curve includes a rectilinear portion upstream from the downstream circular arc, said rectilinear portion extending from a vertical plane containing the aircraft to the downstream circular arc.

In a second implementation, said guard curve is constructed from a "static" guard curve comprising a "downstream" circular arc presenting a "downstream" radius equal to the sum of a predetermined minimum pitch-down radius plus a predetermined minimum pull-up radius, and an "upstream" circular arc presenting a secondary radius equal to the sum of said predetermined minimum pull-up radius plus a predetermined guard height, the upstream circular arc and the downstream circular arc presenting a common tangent at the point where they join together.

In addition to a method, the invention provides a piloting assistance device having a processor unit. The processor unit includes computer means and a memory, the memory containing stored instructions, and the computer means executing the instructions in order to apply the above-described method.

Thus, the device has means for determining at least one "main" guard curve as a function of predetermined pitch-down and pull-up maneuvering capabilities of the aircraft, means for determining all of the obstacles present in at least one search zone, means for performing a comparison between the top of each obstacle in a search zone with said main guard curve, means for determining a "most dangerous" obstacle as a function of said comparison, and means for providing a pilot with information about the most dangerous obstacle.

The invention also provides an aircraft including such a piloting assistance device.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which.

Elements present in more than one of the figures are given the same references in each of them.

DETAILED DESCRIPTION OF THE INVENTION

Figure 1:
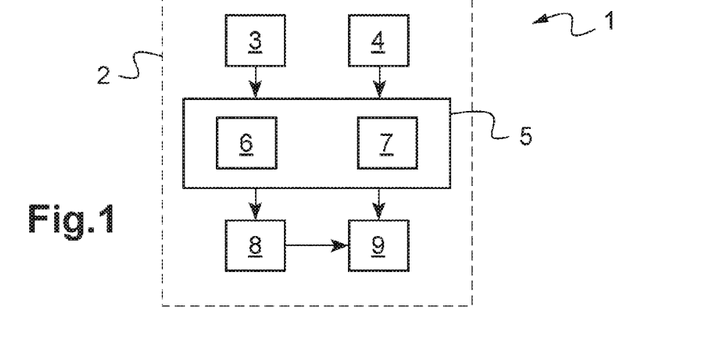
FIG. 1 is a diagram of an aircraft of the invention.

FIG. 1 shows an aircraft 1 of the invention. For example, the aircraft 1 is a rotorcraft.

The aircraft 1 includes a piloting assistance device 2 for facilitating flight at low altitude. This piloting assistance device 2 includes at least one locating system for locating obstacles.

Under such circumstances, the piloting assistance device may include a locating system 3 of the database type. Such a database usually stores a list of obstacles and their locations. Such databases are commercially available.

As an alternative or in addition, the piloting assistance device may include a telemeter 4. For example, the aircraft 1 may be fitted with a telemeter of the kind known under the acronym Lidar. A telemeter serves in particular to measure the bearings and the distances for all obstacles situated in at least one search zone.

Furthermore, the piloting assistance device includes a processor unit 5, which is connected to each locating system.

The processor unit is provided with computer means 6, such as a processor, for example. Furthermore, the processor unit includes a memory 7. The memory 7 may comprise one or more storage means. The memory 7 contains instructions executed by the computer means in order to perform the method of the invention.

Thus, the processor unit determines all obstacles that are present in at least one search zone by using data transmitted over a wired or wireless connection by the locating systems. Furthermore, the processor unit establishes at least one main guard curve associated with the aircraft.

In addition, an alarm system 9 is connected to a display 8 or to the processor unit 5. Such an alarm system may generate an alarm that is audible, visible, and/or tactile, for example.

Figure 2:
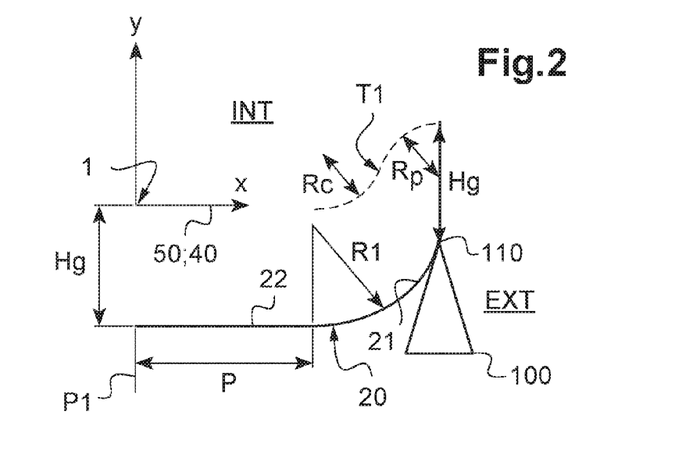
FIG. 2 is a diagram showing the main guard curve in a first implementation.

FIG. 2 shows a guard curve established in a first implementation.

Independently of the implementation, the aircraft 1 travels in a direction of advance 50 with a speed vector 40. The maneuver for enabling the aircraft 1 to avoid an obstacle consists in a pull-up maneuver followed by a pitch-down maneuver to return to a guard height Hg above the obstacle 100. By applying maximum load factors for pulling up nc and for pitching down np, the optimum path T1 is made up of two circular arcs of respective radii Rc and Rp.

Under such circumstances, the processor unit determines, at each computation instant, at least one main guard curve associated with the aircraft. The main guard curve 20 is defined as being the curve for which the aircraft flying on its current path will avoid obstacles that are situated externally (EXT) relative to the guard curve, and for which the aircraft flying on its current path needs to maneuver in order to avoid obstacles that are situated internally (INT) relative to the guard curve. Consequently, an obstacle situated above the guard curve represents an obstacle that is potentially dangerous.

The term "above" means that an item is situated above another item in the vertical gravity direction. Thus, the term "obstacle situated above the guard curve" means an obstacle that is situated higher than and over the guard curve.

Independently of the implementation, the guard curve presents a downstream circular arc 21. This downstream circular arc presents a downstream radius R1 equal to the sum of a predetermined minimum pull-up radius Rc and a predetermined minimum pitch-down radius Rp for the aircraft.

The predetermined minimum pitch-down radius Rp and the predetermined minimum pull-up radius Rc may be respectively defined by way of example by the following relationships:

$$Rc = \frac{V^2}{g*(nc-1)}$$

$$Rp = \frac{V^2}{g*(1-np)}$$

in which "V" is the speed of the aircraft, "g" is the acceleration due to gravity, "Rc" is the pull-up radius of curvature, "Rp" is the pitch-down radius of curvature, "nc" is a maximum pull-up load factor, and "np" is a maximum pitch-down load factor.

In the first implementation, the main guard curve 20 has a rectilinear portion 22 upstream from the downstream circular arc 21. This rectilinear portion 22 extends from a vertical plane P1 containing the aircraft 1 as far as the downstream circular arc 21 over a warning length P.

The main guard curve may be positioned at a guard height Hg under the aircraft.

Such a guard curve may be established in application of the teaching of Document FR 2 712 251.

Figure 3:
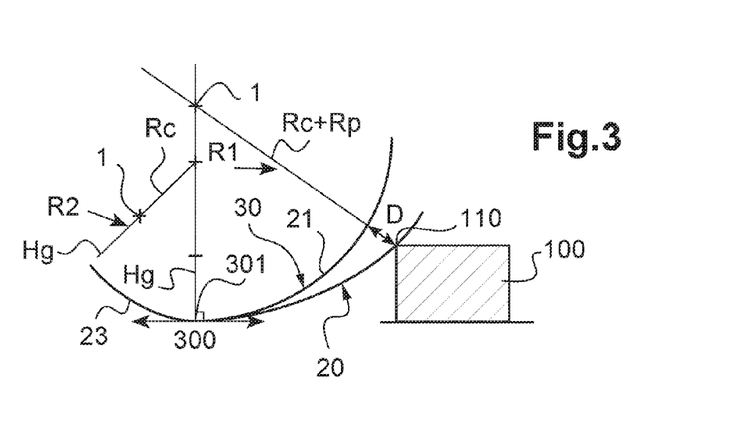
FIG. 3 is a diagram showing the main guard curve in a second implementation.

In the second implementation of FIG. 3, the main guard curve 20 is constructed from a static guard curve 30 including an upstream circular arc 23 presenting a secondary radius R2. This secondary radius R2 is equal to the sum of the predetermined minimum pull-up radius Rc plus a predetermined guard height Hg. Under such circumstances, the upstream circular arc 23 and the downstream circular arc 21 present a common tangent 300 at the point 301 where they join together.

The main guard curve is the locus of points situated at a normal distance D from the static guard curve and satisfying the relationship:

$$D + \tau = \frac{dD}{dt} = 0$$

where "τ" is a predetermined warning time and $$\frac{dD}{dt}$$

is the derivative of D relative to time.

This main guard curve may move together with the aircraft under conditions that depend on the successive orientations of the speed vector during flight. For example, while the aircraft is pulling up, the guard curve remains stationary. The aircraft is then capable, while continuing its pull-up movement to a greater or lesser extent, of passing over any obstacle that is external relative to the static guard curve.

In contrast, as soon as the aircraft begins a pitch-down path, the guard curve pivots with the aircraft.

Such a guard curve is also referred to as a "dynamic" guard curve and it may be established in application of the teaching of Document FR 2 886 439.

Figure 4:
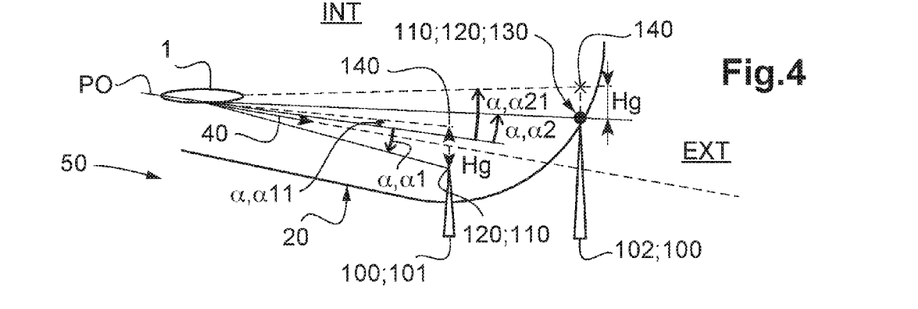
FIG. 4 is a diagram showing the comparison of an obstacle with the main guard curve as established in a first implementation.
Figure 5:
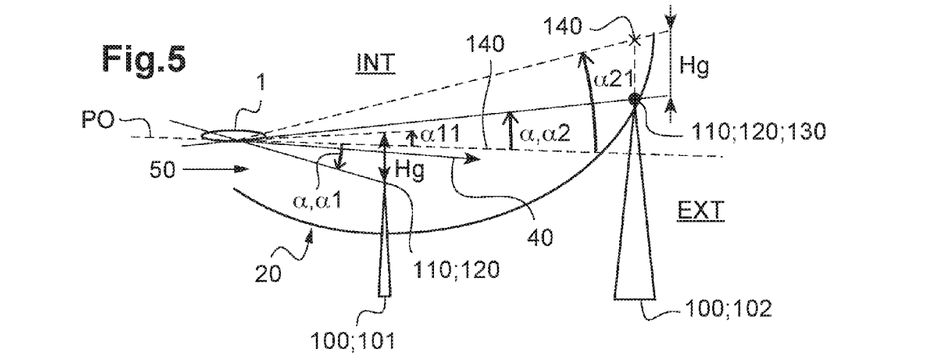
FIG. 5 is a diagram showing the comparison of an obstacle with the main guard curve as established in a second implementation.

With reference to FIGS. 4 and 5, the processor unit performs a comparison by comparing the top 110 of each obstacle 100 in a search zone with the main guard curve 20. Among the obstacles 100 identified by the locating system, the processor unit determines the obstacle 130 that is said to be the "most dangerous".

The processor unit determines in particular the coordinates of the top 110 of the obstacles 100, and then determines the positions of these tops, at least relative to the main guard curve 20.

If an obstacle 100 has a top 110 situated above the main guard curve 20, and thus internally INT relative to the main guard curve 20, then the obstacle is a potentially dangerous obstacle 120. FIG. 4 shows a first obstacle 101 and a second obstacle 102, each of which represents a potentially dangerous obstacle 120.

Under such circumstances, the processor unit determines the sight angle $\alpha$ for each potentially dangerous obstacle 120 that is detected.

The processor unit then considers that the potentially dangerous obstacle 120 having the greatest sight angle constitutes the most dangerous obstacle 130 that needs to be taken into consideration for directing the aircraft.

In a first variant, the sight angle of an obstacle may be established by determining the angle between a horizontal reference plane P0 containing the aircraft 1 and a straight line passing from said aircraft 1 to the top 110 of the obstacle.

In this variant, the first obstacle 101 presents a first sight angle $\alpha 1$ and the second obstacle 102 presents a second sight angle $\alpha 2$.

By convention, each sight angle $\alpha$ of an obstacle is said to be positive when a point associated with the obstacle and identified by the sight angle lies above the horizontal reference plane P0 containing the aircraft 1, and negative when it is below the reference plane.

Under such circumstances, the first sight angle $\alpha 1$ has a negative value and the second sight angle $\alpha 2$ has a positive value. As a result, the second obstacle 102 presents a second sight angle that is greater than the first sight angle of the first obstacle. Consequently, the second obstacle constitutes the most dangerous obstacle 130.

In a second variant, in order to determine the sight angle of a potentially dangerous obstacle:

the processor unit determines the position of a "safety" point 140 situated above the potentially dangerous obstacle at a predetermined guard height Hg above the potentially dangerous obstacle 120; and the processor unit determines a sight angle of said safety point, said sight angle of the potentially dangerous obstacle then being equal to said sight angle of said safety point.

As shown in FIG. 4, the first obstacle 101 presents a first sight angle $\alpha 11$ and the second obstacle 102 presents a second sight angle $\alpha 21$.

Under such circumstances, the first sight angle $\alpha 11$ has a small positive value and the second sight angle $\alpha 21$ has a large positive value. As a result, the second obstacle 102 presents a second sight angle that is greater than the first sight angle of the first obstacle. Consequently, the second obstacle constitutes the most dangerous obstacle 130.

FIG. 5 shows the described method being applied with a primary guard curve that is established in the second implementation.

Figure 6:
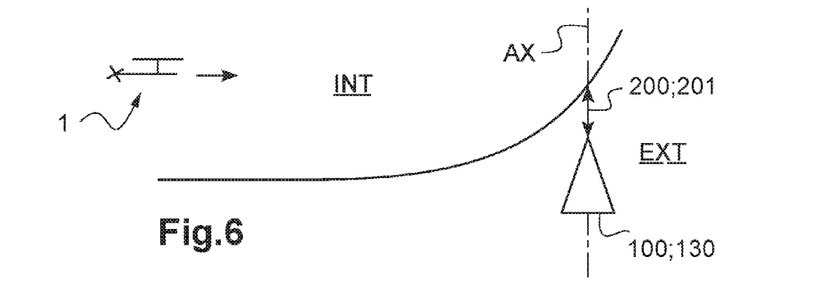
FIG. 6 is a diagram showing the comparison of an obstacle that is not potentially dangerous with the main guard curve established in the first implementation.

With reference to FIG. 6 and in a first alternative, if no obstacle is a potentially dangerous obstacle 120, a value for a different criterion 200 is determined for each obstacle 100, which value represents a difference 201 between the obstacle 100 and the main guard curve 20. The most dangerous obstacle 130 is then the obstacle presenting the smallest difference criterion 200.

The difference criterion 200 may for example be a height between the top 110 of the obstacle 100 and the main guard curve 20 in a vertical direction AX.

FIG. 6 shows a main guard curve in the first implementation. Nevertheless, the first alternative is applicable to the second implementation.

Figure 7:
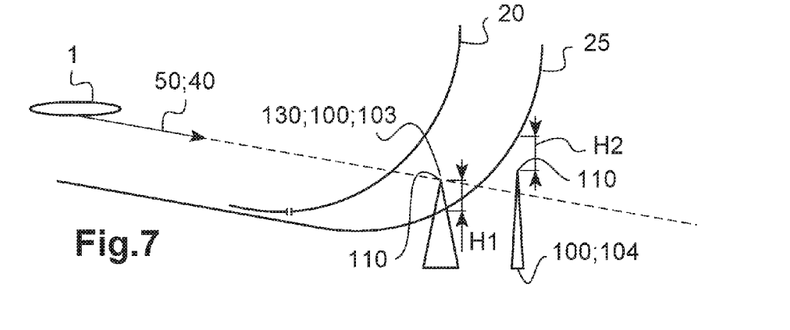
FIG. 7 is a diagram showing a method making use of a main guard curve and of a secondary guard curve.

In the second alternative of FIG. 7, the processor unit determines a "secondary" guard curve 25 that is offset in time relative to the main guard curve 20.

The secondary guard curve 25 is thus situated at least in part downstream from the main guard curve 20 in the direction of advance 50 of the aircraft 1.

Under such circumstances, if no obstacle constitutes a potentially dangerous obstacle situated above the main guard curve, then the most dangerous obstacle 130 represents the obstacle having its top 110 situated the highest relative to the secondary guard curve 25.

In the example of FIG. 7, a first obstacle 103 is situated at a first height H1 above the secondary guard curve 25. However, a second obstacle 104 is situated at a second height H2 below the secondary guard curve 25.

As a result, the first height H1 has a positive value and the second height has a negative value. The first obstacle 103 then represents the most dangerous obstacle 130.

FIG. 7 shows a main guard curve and a secondary guard curve in application of the first implementation. Nevertheless, the first alternative is applicable to the second implementation.

Likewise, the main guard curve and the secondary guard curve could be different.

Furthermore, and independently of the alternative that is applied, in the absence of any obstacle, the ground may represent the obstacle that is the most dangerous.

Figure 8:
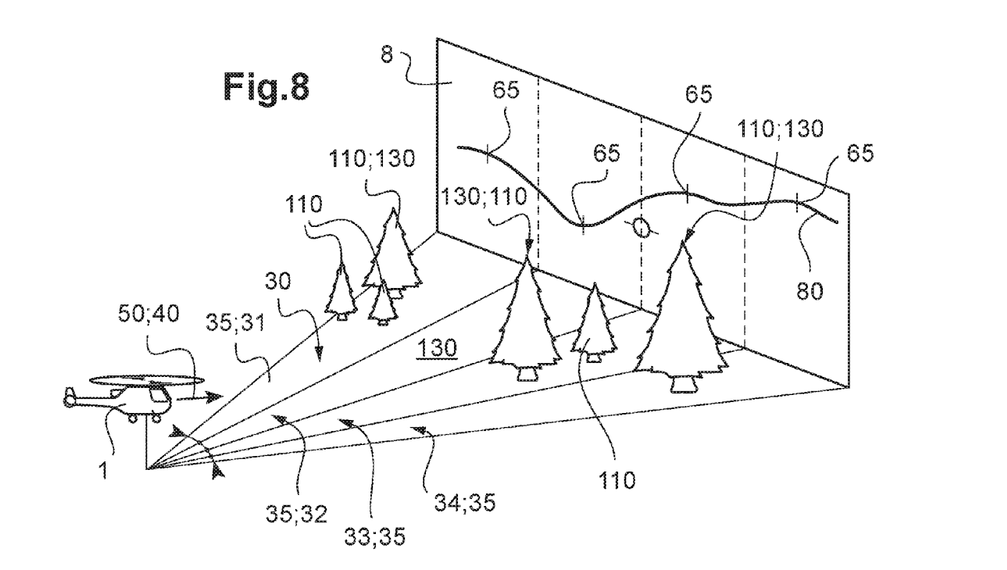
FIGS. 8 and 9 are diagrams showing the information transmitted to a pilot on a display.

With reference to FIG. 8, the forward field 30 situated in front of the aircraft may be subdivided into a plurality of search zones 35. For example, the forward field is subdivided into four angular sectors forming four search zones 35, namely a first search zone 31, a second search zone 32, a third search zone 33, and a fourth search zone 34.

The processor unit then determines the most dangerous obstacle in each of the search zones.

Furthermore, the processor unit provides a pilot with information about the most dangerous obstacle in each search zone.

Thus, the processor unit is connected to a display 8.

As a result, the processor unit causes the display 8 to display a symbol 65 in association with each most dangerous obstacle 130. Each symbol 65 thus represents the most dangerous obstacle 130 in a given search zone 35.

Furthermore, the processor unit may cause a safety cordon 80 to be displayed interconnecting said symbols 65.

Figure 9:
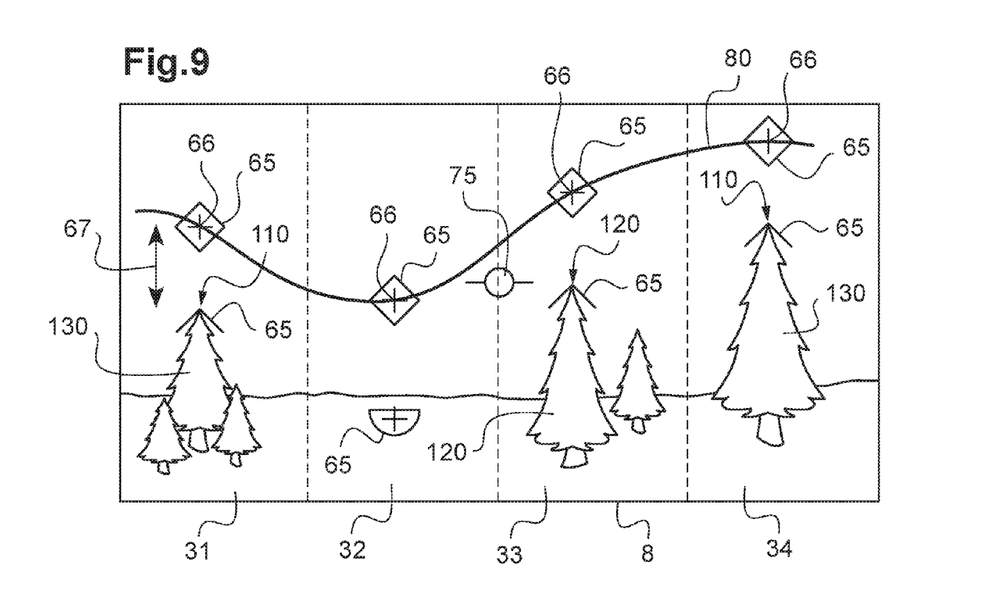

With reference to FIG. 9, the display 8 may display by way of example a representation of the external landscape. The display superposes each symbol 65 on this representation.

Each symbol 65 may be positioned at the top of the most dangerous obstacle shown.

In another obstacle, in each search zone 35, the processor unit determines the coordinates of a reference point 66 situated at a predefined distance 67 above the top 110 of the most dangerous obstacle 130. The symbol 65 then represents the reference point 66.

In order to facilitate piloting the aircraft, the processor unit determines a speed vector 40 of the aircraft 1 collimated at infinity, by using appropriate members of the aircraft. The processor unit then displays a sign 75 representing this speed vector 40 on the display 8.

Furthermore, the piloting assistance device may trigger an alarm when the speed vector 40 lies below the safety cordon 80, as in the example shown.

The display options of Document FR 2 712 251 are also applicable in the present invention.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of assisting low altitude piloting of an aircraft, the method comprising:
   determining, by a processor of a piloting assistance device on-board the aircraft, a main guard curve associated with the aircraft as the aircraft is flying forward in a direction of advance, the main guard curve being determined as a function of predetermined pull-up and pitch-down maneuvering capabilities of the aircraft;
   determining, by at least one obstacle locating system of the piloting assistance device, all the obstacles present in a search zone of a forward field situated in front of the aircraft;
   performing, by the processor, a comparison between a top of each obstacle present in the search zone and the main guard curve;
   wherein when at least one of the obstacles present in the search zone is a potentially dangerous obstacle having a top situated above the main guard curve,
      determining, by the processor, a sight angle ($\alpha$) for the top of each potentially dangerous obstacle; and
      determining, by the processor, the potentially dangerous obstacle presenting the greatest sight angle ($\alpha$) as being a most dangerous obstacle present in the search zone;
   wherein when no obstacle present in the search zone is a potentially dangerous obstacle having a top situated above the main guard curve,
      determining, by the processor, a value of a difference criterion for each obstacle present in the search zone representing the difference between the obstacle present in the search zone and the main guard curve, wherein the difference criterion of an obstacle is a height between a top of the obstacle and the main guard curve in a vertical direction; and
      determining, by the processor, a most dangerous obstacle present in the search zone as being the obstacle present in the search zone having a smallest value of the difference criterion; and
   communicating, by a display or an alarm of the piloting assistance device, information to a pilot about the most dangerous obstacle present in the search zone.

2. The method according to claim 1, wherein in order to determine the sight angle ($\alpha$) for the top of each potentially dangerous obstacle, the following steps are performed by the processor:
   determining the position of a safety point situated above the potentially dangerous obstacle at a predetermined guard height above the potentially dangerous obstacle;
   determining a sight angle of the safety point; and
   setting the sight angle ($\alpha$) for the top of the potentially dangerous obstacle as being equal to the sight angle of the safety point.

3. The method according to claim 1, wherein a sight angle of an obstacle is considered as being positive when a point associated with the obstacle and identified by the sight angle of the obstacle is located above a horizontal reference plane containing the aircraft and as being negative when the point associated with the obstacle and identified by the sight angle of the obstacle is located below the horizontal reference plane containing the aircraft.

4. A method of assisting low altitude piloting of an aircraft, the method comprising:
   determining, by a processor of a piloting assistance device on-board the aircraft, a main guard curve associated with the aircraft as the aircraft is flying forward in a direction of advance, the main guard curve being determined as a function of predetermined pull-up and pitch-down maneuvering capabilities of the aircraft;
   determining, by at least one obstacle locating system of the piloting assistance device, all the obstacles present in a search zone of a forward field situated in front of the aircraft;
   performing, by the processor, a comparison between a top of each obstacle present in the search zone and the main guard curve;
   wherein when at least one of the obstacles present in the search zone is a potentially dangerous obstacle having a top situated above the main guard curve,
      determining, by the processor, a sight angle ($\alpha$) for the top of each potentially dangerous obstacle; and
      determining, by the processor, the potentially dangerous obstacle presenting the greatest sight angle ($\alpha$) as being a most dangerous obstacle present in the search zone;
   wherein when no obstacle present in the search zone is a potentially dangerous obstacle having a top situated above the main guard curve,
      determining, by the processor, a secondary guard curve that is offset in time relative to the main guard curve, by being situated at least in part downstream from the main guard curve in the direction of advance of the aircraft;
      determining, by the processor, a most dangerous obstacle in the search zone as being the obstacle present in the search zone having its top situated the highest relative to the secondary guard curve; and
   communicating, by a display or an alarm of the piloting assistance device, information to a pilot about the most dangerous obstacle present in the search zone.

5. The method according to claim 1, wherein the forward field situated in front of the aircraft is subdivided into a plurality of search zones, and a most dangerous obstacle is determined for each search zone.

6. The method according to claim 5, wherein a symbol is displayed on the display for the most dangerous obstacle in each search zone and a safety cordon is displayed interconnecting the symbols.

7. The method according to claim 6, wherein a speed vector of the aircraft collimated at infinity is determined and a sign is displayed representing the speed vector on the display, with an alarm being triggered when the speed vector is below the safety cordon.

8. The method according to claim 6, wherein in each search zone the coordinates are determined of a reference point situated at a predefined distance above the top of the most dangerous obstacle in the search zone, the symbol representing the reference point.

9. The method according to claim 1, wherein the main guard curve includes a downstream circular arc presenting a downstream radius equal to the sum of a predetermined minimum pull-up radius plus a predetermined minimum pitch-down radius.

10. The method according to claim 9, further comprising determining a secondary guard curve, wherein the main guard curve and the secondary guard curve present two different respective downstream radii.

11. The method according to claim 9, wherein the main guard curve includes a rectilinear portion upstream from the downstream circular arc, the rectilinear portion extending from a vertical plane containing the aircraft to the downstream circular arc.

12. The method according to claim 1, wherein the main guard curve is constructed from a static guard curve including (i) a downstream circular arc presenting a downstream radius equal to the sum of a predetermined minimum pitch-down radius plus a predetermined minimum pull-up radius and (ii) an upstream circular arc presenting a secondary radius equal to the sum of the predetermined minimum pull-up radius plus a predetermined guard height, the upstream circular arc and the downstream circular arc presenting a common tangent at the point where they join together.

13. A piloting assistance device for use on-board an aircraft, the piloting assistance device comprising:
    at least one obstacle locating system configured to determine all the obstacles present in a search zone of a forward field situated in front of the aircraft;
    a processor unit configured to
        determine a main guard curve associated with the aircraft as the aircraft is flying forward in a direction of advance, the main guard curve being determined as a function of predetermined pull-up and pitch-down maneuvering capabilities of the aircraft;
        perform a comparison between a top of each obstacle present in the search zone and the main guard curve,
        when at least one of the obstacles present in the search zone is a potentially dangerous obstacle having a top situated above the main guard,
            determine a sight angle ($\alpha$) for the top of each potentially dangerous obstacle; and
            determine the potentially dangerous obstacle presenting the greatest sight angle ($\alpha$) as being a most dangerous obstacle present in the search zone;
        when no obstacle present in the search zone is a potentially dangerous obstacle having a top situated above the main guard curve,
            determine a value of a difference criterion for each obstacle present in the search zone representing the difference between the obstacle present in the search zone and the main guard curve, wherein the difference criterion of an obstacle is a height between a top of the obstacle and the main guard curve in a vertical direction; and
            determine a most dangerous obstacle present in the search zone as being the obstacle present in the search zone having a smallest value of the difference criterion; and
    at least one of a display or an alarm configured to communicate information to a pilot about the most dangerous obstacle present in the search zone.

14. An aircraft comprising:
    at least one obstacle locating system configured to determine all the obstacles present in a search zone of a forward field situated in front of the aircraft;
    a processor unit configured to
        determine a main guard curve associated with the aircraft as the aircraft is flying forward in a direction of advance, the main guard curve being determined as a function of predetermined pull-up and pitch-down maneuvering capabilities of the aircraft;
        perform a comparison between a top of each obstacle present in the search zone and the main guard curve,
        when at least one of the obstacles present in the search zone is a potentially dangerous obstacle having a top situated above the main guard curve,
            determine a sight angle ($\alpha$) for the top of each potentially dangerous obstacle; and
            determine the potentially dangerous obstacle presenting the greatest sight angle ($\alpha$) as being a most dangerous obstacle present in the search zone;
        when no obstacle present in the search zone is a potentially dangerous obstacle having a top situated above the main guard curve,
            determine a secondary guard curve that is offset in time relative to the main guard curve, by being situated at least in part downstream from the main guard curve in the direction of advance of the aircraft; and
            determine a most dangerous obstacle present in the search zone as being the obstacle present in the search zone having its top situated the highest relative to the secondary guard curve; and
    at least one of a display or an alarm configured to communicate information to a pilot about the most dangerous obstacle present in the search zone.

* * * * *